United States Patent Office 3,562,311
Patented Feb. 9, 1971

3,562,311
POLYFUNCTIONAL DIMERS
James D. McClure, San Francisco, Calif., assignor to Shell Oil Company, New York, N.Y., a Delaware corporation
No Drawing. Filed Feb. 18, 1963, Ser. No. 259,428
Int. Cl. C07c $121/20$
U.S. Cl. 260—465.8
8 Claims

ABSTRACT OF THE DISCLOSURE 2-methyleneglutaronitrile is prepared via tertiary phosphine catalyzed dimerization of acrylonitrile.

This invention relates to new compositions of matter and to a process for the preparation of such compositions. More particularly, the present invention relates to polyfunctional dimers of olefinic nitriles and to a catalytic process for the preparation of such polyfunctional dimers.

It is well known that beta-methyl crotononitrile reacts with acrylonitrile in the presence of an alkaline condensing agent to produce alpha-isopropylidineglutaronitrile, as disclosed in U.S. Pat. 2,352,515 to Bruson. This reaction requires a so-called desmotropic system of three carbon atoms which must be attached to a nitrile group in order for the reaction with acrylonitrile to proceed. It is also known that substituted acrylonitrile compounds such as methacrylonitrile (wherein a methyl group deactivates the olefinic double bond) may be thermally dimerized to produce alpha-methylene-δ-methyladiponitrile, as disclosed in U.S. Pat. 2,566,203 to Hogsed. The thermal dimerization of acrylonitrile at temperatures of from 190° C. to 300° C. gives a mixture of cyclic products such as cis- and trans-1,2-dicyanocyclobutane, as disclosed in J. Am. Chem. Soc., 71, 324 (1949). Attempts to prepare unsaturated linear oligomers of acrylonitrile, however, have lead to the polymerization of the acrylonitrile. Efforts to retard polymerization in the thermal preparation of linear dimers by adding a polymerization inhibitor such as hydroquinone to the reactants have been only partially successful. U.S. Pat. 2,232,785 to Howk discloses a process for the preparation of liquid polymers of low molecular weight by incorporating an inhibitor in the reaction mixture. Such processes, however, do not produce acrylonitrile dimers with an active alpha-methylene group. The production of an acrylonitrile dimer by an indirect means is disclosed in U.S. Pat. 2,609,385 to Schreyer, but the nitrile products obtained all have a methylene in the beta- rather than the alpha-position with respect to the nitrile group.

It is therefore a principal object of this invention to provide a novel linear dimer of acrylonitrile. It is a further object to provide an acrylonitrile dimer having a methylene substituent on a carbon atom alpha to a nitrile function and it is also an object to provide a process for the production of such a dimer.

These objects are accomplished through the provision of a process whereby acrylonitrile is dimerized in the presence of a tertiary phosphine catalyst to form 2-methyleneglutaronitrile. This process provides a compound having a carbon-carbon ethylenic bond that is both terminal, i.e., methylenic, and that is conjugated with a nitrile function. These structural features, coupled with the alpha, gamma-dinitrile structure, form a compound that is uniquely useful and different.

The dimerization of acrylonitrile is conducted at temperatures ranging from ambient room temperature, i.e., 20–30° C., up to about 200° C. Temperatures from about 80° to about 150° are especially suitable for the dimerization and are to be preferred. The higher temperatures generally result in higher conversions of acrylonitrile, but also result in lower yields due to the formation of side products. Comparatively low temperatures, therefore, appear to be superior, for unreacted acrylonitrile may be easily separated and recycled. However, any temperature below the decomposition temperature of 2-methyleneglutaronitrile may be used.

In the process of the present invention, 2-methyleneglutaronitrile is prepared by dimerizing acrylonitrile in the presence of a tertiary phosphine as a catalyst.

The tertiary phosphines wherein the organic groups are hydrocarbon, that is, tertiary phosphines containing only hydrogen and carbon atoms, beside phosphorus, are a preferred class. The catalyst may contain up to 60 carbon atoms in the organic portion of the molecule, but usually contains no more than a total of 45 carbon atoms.

The compounds which may be employed in the process of the present invention include compounds represented by the formula $PR_3$, wherein R is an organic group, usually of up to 20 carbon atoms but preferably having from 1 to 12 carbon atoms, that is attached to phosphorus by a carbon-phosphorus bond. It will be understood that tertiary diphosphines are equivalently useful. These diphosphines may be represented by the general formula $R_2P—R'—PR_2$ wherein R has the above significance, and R' is a divalent radical corresponding to R.

Preferably, the R's are alkyl of up to 12 carbon atoms, as illustrated by methyl, ethyl, propyl, iso-propyl, butyl, sec-butyl, tert-butyl and iso-butyl radicals as well as the isomeric pentyl, hexyl, heptyl, nonyl, decyl, undecyl and dodecyl radicals; or aryl, including alkaryl and aralkyl of up to 12 carbon atoms such as phenyl, tolyl, cumyl, xylyl, naphthyl, 3,3-diphenylpropyl and 2,7-dimethylnaphthyl radicals; cycloalkyl such as cycloheptyl, cyclohexyl, methylcyclohexyl and 3,3,5-trimethylcyclohexyl radicals; alkenyl such as ethenyl, propenyl, butenyl, pentenyl and like radicals; and corresponding cycloalkenyl radicals, such as 2,3,4-trimethylcyclopentyl. The phosphorus substituents may all be the same, or may be in part or wholly different. Aryl phosphines, as for example when R is phenyl, generally give lower yields of dimer than when tertiary phosphines containing alkyl substituents are used as catalysts, and therefore tri-alkylphosphines are the most preferred catalyst type. Examples of suitable catalysts include trialkylphosphines, triarylphosphines and mixed aryl alkyl phosphines such as diethylbutylphosphine, tri-n-butylphosphine, tri-(2-ethylhexyl)-phosphine, di-n-propylphenylphosphine, diphenylhexylphoshine, 2-(dibutylphosphino)-ethyldiethylphosphine and 3-(di-n-propylposhino) propyldibutylphosphine.

Although in general, the trihydrocarbon phosphines are more readily available than those containing non-reactive substituents, some such substituted tertiary phosphines are available which are useful in the present process. Illustrative of these are the cyanoalkyl phosphines, especially beta-cyanoalkylphosphines such as dimethyl-beta-cyanoethylphosphine, ethyl-di(beta-cyanoethyl)-phosphine, diphenyl-beta-cyanoethylphosphine and the like, as well as (dialkylamino)alkyl phosphines such as tri($\beta$-dimethylaminoethyl) - phosphine and diethyl-(3-dimethylaminopropyl)-phosphine. Also satisfactory are the tertiary phosphines containing nonterminal oxaalkyl linkages as illustrated by dimethyl-(2-ethoxyethyl)-phosphine and propyl-di-(3-n-butoxypropyl)-phosphine and the like. Also suitable are tertiary phosphines wherein one or more of the substituents is halogenated, particularly when the substituents are chlorinated. Illustrative of such tertiary phosphines are di-n-butyl-(3-chlorobutyl)-phosphine and di-n-propyl-(2-chloropropyl)-phosphine.

The phosphine may itself be coordinated to a metal, preferably a metal of Group VIII of the Periodic Table, e.g., iron, nickel, cobalt, ruthenium, rhodium, palladium, osmium, iridium and platinum, which is further stabilized by other electron donating ligands such as carbonyl groups.

Although a solvent is not necessary in the process, the dimerization is preferably conducted in the presence of a solvent. Suitable solvents include the hydrocarbons such as hexane, cyclohexane, isooctane, toluene or benzene, as well as mixtures of such solvents; and oxygen-containing solvents which do not substantially interfere with the course of the reaction such as esters, ethers and the like. Any inert solvent or mixture of solvents that is liquid at the reaction temperature may be used. For example, dialkyl sulfoxides wherein the alkyl moiety has from 1 to 4 carbon atoms may be used. Linear and cyclic ethers such as the substituted and unsubstituted tetrahydropyrans and tetrahydrofurans as well as the dialkyl diethylene glycol ethers may be used as solvents. However, preferred solvents are the alcohols, and particularly preferred are the tertiary alcohols, e.g., tert-butyl alcohol, tert-amyl alcohol, triethyl carbinol, diethyl methyl carbinol and the like. Primary and secondary alcohols may be employed, but lower yields of product are obtained as a result of side reactions, such as addition to the double bond of acrylonitrile. Therefore, tertiary alcohols which are relatively inert to this double bond addition give optimum results.

The dimerization may be conducted at pressures up to 100 atmospheres, or as low as 0.1 atmosphere, but for reasons of ease of handling, it is customary to conduct the reaction at substantially atmospheric pressure.

The structure of the dimer product has been established by both chemical and physical means as being 2-methyleneglutaronitrile, $CH_2=C(CN)CH_2CH_2CN$.

Because of the unique combination of structural features of the compound of the invention, as illustrated by the terminal conjugated olefinic linkage and the alpha, gamma-dinitrile function, the 2-methyleneglutaronitrile finds utilization as an intermediate in the production of a variety of chemical products. Having an active terminal olefinic linkage, the dinitrile may be polymerized through this linkage to form a polynitrile polymer. As the olefinic linkage is activated by conjugation with a nitrile group, a molecule of hydrogen cyanide may be added to the double bond to form the novel trinitrile, 2-cyanomethylglutaronitrile, which in turn may be hydrolyzed to the corresponding tricarboxylic acid. The ethylenic linkage may be epoxidized by treatment with a basic hypohalite solution to form the novel epoxydicarboxylic acid, 4,5-epoxy-4-carboxyvaleric acid, the nitrile groups being hydrolyzed under the reaction conditions. Through epoxidation techniques using peracids or peroxides, the novel epoxydiamide, 4,5-epoxy-4-carbamylvaleramide is produced. The epoxyacid or the epoxyamide may be used to prepare epoxy resins through reaction of the active terminal epoxy group with the acid or amide moiety of other molecules or with other curing agents. The 2-methyleneglutaronitrile may be reduced to the corresponding diamine, which because of the resulting 1,5-diamino structure, finds utility as a chelating agent. The diamine is cyclized by conventional means to form a substituted pyridine, although alternatively, the 2-methylene glutaronitrile may be cyclized to a pyridine derivative, as by treatment with acid. In addition, of course, 2-methyleneglutaronitrile is readily hydrolyzed to 2-methyleneglutaric acid or 2-methylene glutaramide.

To illustrate the preparation of the novel dimer of the invention, the following examples are provided. It should be understood that these examples are illustrative only, and are not to be regarded as limitations, as the teachings thereof may be varied as will be understood by one skilled in this art.

EXAMPLE I

A solution of 40 g. of acrylonitrile and 0.45 g. of tributylphosphine in 100 g. of tertiary butyl alcohol was placed in a glass-lined reactor under nitrogen and heated to 104±2° C. for a period of seven hours. The mixture was neutralized with 0.15 g. of acetic acid and filtered. The filtrate was then distilled under reduced pressure to remove solvent and unreacted acrylonitrile. The yield of 2-methyleneglutaronitrile was 69% based upon a 34% conversion of acrylonitrile.

EXAMPLE II

A solution of 40 g. of acrylonitrile and 0.3 g. of tributylphosphine in 80 g. of tertiary butyl alcohol was heated to 98±3° C. and held at this temperature for 6.5 hours in a glass-lined reactor under a nitrogen atmosphere. The reaction mixture was filtered and the filtrate treated with 0.1 g. of glacial acetic acid. The solvent and unreacted acrylonitrile were removed by distillation under reduced pressure, and the residual liquid, after further vacuum distillation, showed a 75% yield of 2-methyleneglutaronitrile based upon the acrylonitrile converted.

EXAMPLE III

In this example, the active catalyst moiety is derived from a more complex material containing the catalyst in a complex thereof with a Group VIII metal, which complex slowly releases the catalyst.

A solution of 240 g. of acrylonitrile and 5 grams of dicobalt-di(tributylphosphine) hexacarbonyl in 450 g. of tertiary butyl alcohol with 60 milliliters of benzene was placed in a reactor under an inert atmosphere. The reaction was maintained at 100±5° C. for a period of six hours. The reaction mixture was then filtered and the solvent and excess acrylonitrile were removed by distillation under reduced pressure. Further distillation of the residual liquid gave 48 g. of 2-methyleneglutaronitrile. The yield, based upon acrylonitrile converted, was 71%.

EXAMPLE IV

A solution of 40 g. of acrylonitrile, 0.05 g. of hydroquinone and 1.0 g. of trilaurylphosphine in a glass-lined reactor sealed under nitrogen pressure was maintained at 106±2° C. for 6.5 hours. The mixture was filtered to remove 0.5 g. of solid after neutralization with acetic acid. Unreacted acrylonitrile and solvent were removed by vacuum distillation, and upon further distillation, the residual liquid gave 9.5 g. of 98.7% pure 2-methyleneglutaronitrile, B.P. 62–65° C. at 0.2 mm. This represents a 76% yield.

When the trilaurylphosphine in the above example was replaced by 0.5 g. of tri-octylphosphine, a 75% yield of 2-methyleneglutaronitrile was obtained.

EXAMPLE V

When acrylonitrile is dimerized in 90% dimethylsulfoxide 10% tert-butyl alcohol solution in the presence of 2-(diethylphosphino)-ethyldiethylphosphine as a catalyst, a good yield of 2-methyleneglutaronitrile is obtained.

EXAMPLE VI

Acrylonitrile was dimerized by the procedure of Example I, except that triphenylphosphine was used as a catalyst and the reaction was conducted at 175° C. Good yields of 2-methyleneglutaronitrile were obtained.

I claim as my invention:

1. The process for the production of 2-methyleneglutaronitrile which comprises dimerizing acrylonitrile in tertiary alkanol solution, said alkanol having from 4 to 7 carbon atoms, in the presence of a minor catalytic amount of trialkylphosphine wherein each alkyl has up to 12 carbon atoms, at a temperature of from 80° C. to 150° C.

2. The process for the production of 2-methyleneglutaronitrile which comprises dimerizing acrylonitrile in tertiary butyl alcohol solution in the presence of a minor catalytic amount of tri-n-butylphosphine, at a temperature of from 80° C. to 150° C.

3. The process of claim 1 wherein the tertiary phosphine is provided as di(tri-n-butylphosphine) dicobalt hexacarbonyl.

4. The process of claim 1 wherein the catalyst is tri-n-butylphosphine.

5. The process of claim 1 wherein the catalyst is tri-octylphosphine.

6. The process of claim 1 wherein the catalyst is tri-laurylphosphine.

7. The process for the production of 2-methyleneglutaronitrile which comprises dimerizing acrylonitrile in benzene as a solvent in the presence of a catalytic amount of a trialkylphosphine.

8. The process for the production of 2-methyleneglutaronitrile which comprises dimerizing acrylonitrile in the presence of a catalytic amount of tricyclohexylphosphine and in the absence of a polymerization inhibitor.

References Cited

UNITED STATES PATENTS

| | | | |
|---|---|---|---|
| 2,352,515 | 6/1944 | Bruson | 260—465.8 |
| 2,433,182 | 12/1947 | Wolk | 260—465.8 |
| 2,609,385 | 9/1952 | Schreyer | 260—465.8 |
| 2,677,676 | 5/1954 | Nicholo et al. | 260—465.8 |

OTHER REFERENCES

Takashiva et al., J.A.C.S. 84, Feb. 2, 1962, pp. 489–491.

Beilstein, vol. 2: 3rd supplement, 1961, p. 1944.

JOSEPH P. BRUST, Primary Examiner

U.S. Cl. X.R.

260—88.7, 348, 537, 562, 583